(No Model.) 2 Sheets—Sheet 1.

J. LOCHER.
HAY STACKER.

No. 349,804. Patented Sept. 28, 1886.

WITNESSES.

INVENTOR
JAMES LOCHER
By L. P. Graham
atty.

(No Model.) 2 Sheets—Sheet 2.
J. LOCHER.
HAY STACKER.
No. 349,804. Patented Sept. 28, 1886.
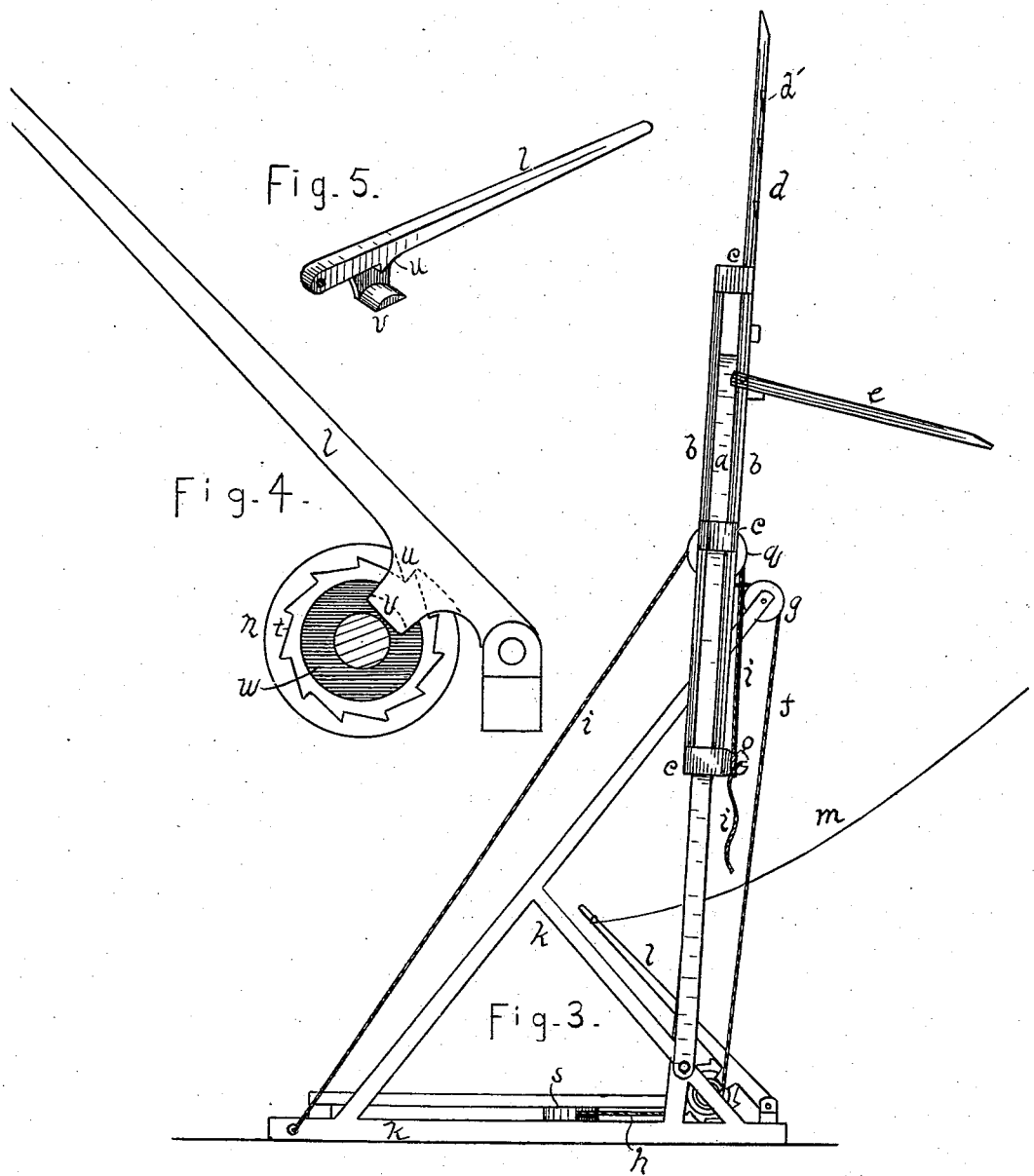
WITNESSES.
J. N. Bills
J. H. Baker
INVENTOR
JAMES LOCHER.
By L. P. Graham
atty.

UNITED STATES PATENT OFFICE.

JAMES LOCHER, OF DECATUR, ILLINOIS.

HAY-STACKER.

SPECIFICATION forming part of Letters Patent No. 349,804, dated September 28, 1886.

Application filed January 23, 1886. Serial No. 189,474. (No model.)

*To all whom it may concern:*

Be it known that I, JAMES LOCHER, a resident of the city of Decatur, county of Macon, and State of Illinois, have invented certain new and useful Improvements in Hay-Stackers, of which the following is a specification.

The object of my invention is, first, to provide means whereby the discharge of a hay-stacker may be readily made to conform to the increasing height of a stack; second, to provide simplified means of controlling the descent of the elevating device, and, third, to increase the retentive power of the elevating-fork.

My invention consists in certain novel features hereinafter described and specifically claimed.

Figure 1:
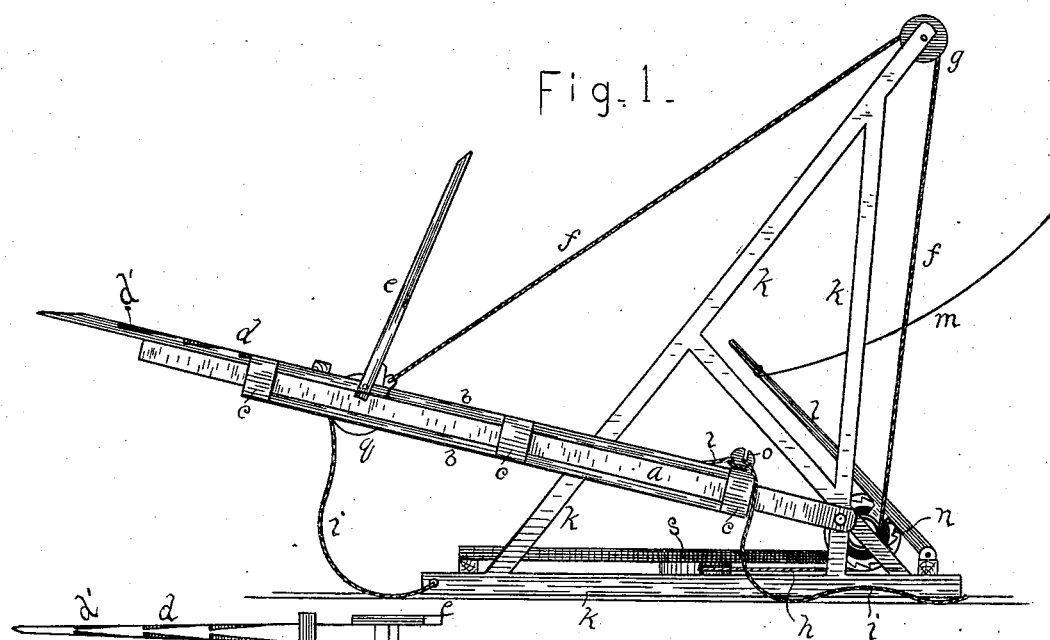
Figure 2:
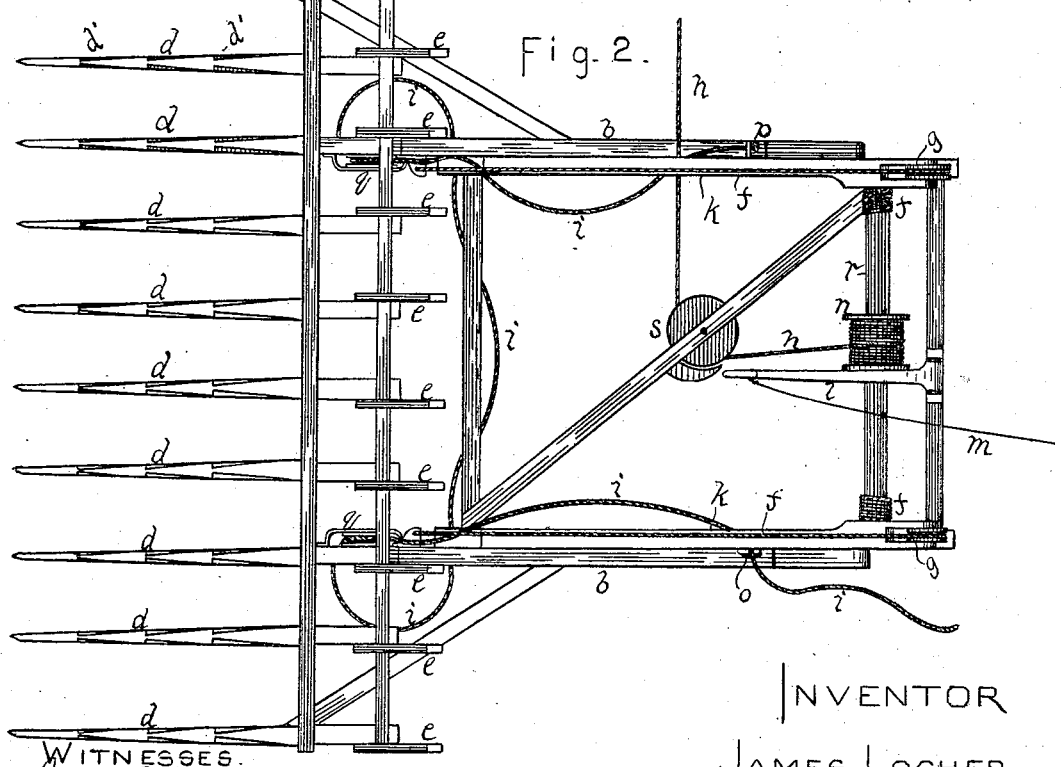

In the drawings accompanying and forming a part of this specification, Figure 1 is a side elevation of a hay-stacker embodying my invention. Fig. 2 is a plan of the same. Fig. 3 is a side elevation of the stacker in position to discharge the hay. Fig. 4 is a side view of the drum and ratchet with the co-operating lever, and Fig. 5 is a perspective view of the combined pawl-lever and friction-clamp.

$a$ represents parallel arms pivoted each at one end. On opposite sides of each of the arms are bars $b$, connected by plates $c$. Supported by bars $b$ is a fork, the teeth $d$ of which have serrations $d'$, of the form shown. A series of guard-fingers, $e$, is located near the rear of the fork at about the angle shown in Figs. 1 and 3. Ropes $f$, extending over pulleys $g\ g$ in frame $k$, connect arms $a$ with axle $r$. A rope, $h$, winds around a drum on axle $r$, and connects said drum with the power that elevates the hay. A rope, $i$, passes through that part of frame $k$ most nearly under the elevating-fork, and after running over pulleys $q\ q$ in arms $a$ is attached to the inner or lower ends of bars $b$. A pulley, $s$, is used to change the direction of rope $h$, and a pawl-lever, $l$, engages a ratchet-wheel on the drum and prevents back motion therein.

In Fig. 4 the ratchet on the drum is clearly shown and designated by reference-letter $t$, and the pawl or catch on the lever $l$ is shown in position by dotted lines at $u$. The ratchet-wheel $t$ is recessed at $w$, and a friction-clamp, $v$, (shown in Fig. 5, and indicated by dotted lines in Fig. 4,) extends from the lever into the recess.

To enable a person on the stack to regulate the descent of the fork a cord, $m$, is attached to lever $l$, as indicated.

One end of the rope $i$ is permanently secured to the bars $b$, as at $p$, Fig. 2, and the other end is temporarily but securely hitched, as at $o$.

The bars $b$ have free motion longitudinally on arms $a$, and so form an extensible frame that may be operated and regulated as hereinafter set forth.

While receiving the hay from the rake in the manner common to hay-stackers, the fork lies on the ground. When a load has been accumulated, power—usually that of a horse—is applied to rope $h$ and conveyed to arms $a$ through drum $n$, axle $r$, and ropes $f\ f$. As the fork rises, the pulleys $q\ q$ take up the slack of rope $i$ and impart a strain thereto, which has the effect of raising the bars $b$ on arms $a$. By shortening the rope $i$ the extension of the frame $a\ b$ may be increased, and vice versa, so that in beginning a stack the rope may be hitched at its full length in $o$, and shortened as the height of the stack increases. To equalize the draft-tension throughout the elevation of the fork the rope $i$ should not begin to raise the bars $b$ until the load is well past the horizontal line, the result being that the increase of strain caused by elevating the bars is compensated for by the general decrease in the weight of the load caused by swinging said load over the fulcrum of the arms.

The extensible frame may be carried past the vertical line, in order to insure a clear discharge, (see Fig. 3,) and the weight of the bars $b$ be relied on to return the same. In explanation of this peculiarity it will be remembered that as the frame is swung up on its pivot the rope $i$ elevates bars $b$ with relation to arms $a$, and that, consequently, in the position shown in Fig. 3 the said bars are entirely supported by said rope. With this understood, it will be readily seen that as the elevation of the frame caused the bars to ascend the arms the descent of the bars with relation to the arms must cause a descent in the frame.

Any suitable means of detachably securing the end of rope $i$ may be substituted for that shown at $o$, and the general construction of the support $k$ and extensible frame $a\ b$ may be varied without affecting the principle of my invention.

By reference to Fig. 4 it will be seen that as the pawl $u$ is withdrawn from contact with the ratchet $t$ the friction-clamp $v$ will engage the inner surface of the ratchet, thereby making it always possible to entirely control the descent of the fork.

The serrations $d'$ of teeth $d$ are easily formed, and are of assistance in retaining the hay on the fork during the process of loading the same.

As a matter of convenience, the rope $i$ is shortened or lengthened at one end only, and to facilitate the operation said rope should move freely in support $k$. In the drawings holes of a size greatly exceeding the diameter of the rope are shown; but it is obvious that friction rollers or pulleys might well be introduced, and that where wire rope is used curved tubular guides for the same would be effective.

By the use of the extensible frame the hay may be carried to the precise elevation needed, thus economizing power while the lower portion of the stack is being built, and precluding the possibility of having the hay scattered by the wind.

I claim as new and desire to secure by Letters Patent—

1. In hay-stackers, the combination of a longitudinally-extensible frame comprising a section pivoted at one end and a section movable thereon and provided with a hay-receptacle, means of elevating the free end of the frame, and a rope anchored under the free end of the frame, passed over said frame near its outer end, and secured to the movable section near the pivot of the frame, substantially as set forth, whereby the elevation of the frame will cause an extension thereof, as specified.

2. The combination, in hay-stackers, of two parallel arms pivoted each at one end, a fork-carrying frame longitudinally movable thereon, suitable means of elevating the outer ends of the arms, and a rope anchored under the free ends of the arms, passed over the arms near their outer extremities, and secured to the movable frame near the pivot of the arms, as and for the purpose set forth.

3. The combination of supporting-frame $k$, carrying pulleys $g$, arms $a$, pivoted in the supporting-frame and carrying pulleys near their outer ends, frame $b$, longitudinally movable on the arms, ropes $f$, extending from the arms over the pulleys in the supporting-frame, and rope $i$, connected with the lower front part of the supporting-frame, passed over the pulleys in the outer portion of the arms, and connected with the inner end of the movable frame, as and for the purpose set forth.

4. The combination of supporting-frame $k$, pulleys $g$, drum $n$, axle $r$, arms $a$, fork-carrying-frames $b$, ropes $f$, rope $h$, and rope $i$, as and for the purpose set forth.

5. The combination of drum $n$, ratchet $t$, having recess $w$, and lever $l$, having pawl-catch $u$ and friction-clamp $v$, as and for the purpose set forth.

JAMES LOCHER.

Attest:
 C. C. CLARK,
 S. S. JACK.